F. G. PECK.
CONTROLLING MEANS FOR ELECTRIC VEHICLES.
APPLICATION FILED JUNE 23, 1914.
1,245,264.
Patented Nov. 6, 1917.
3 SHEETS—SHEET 2.
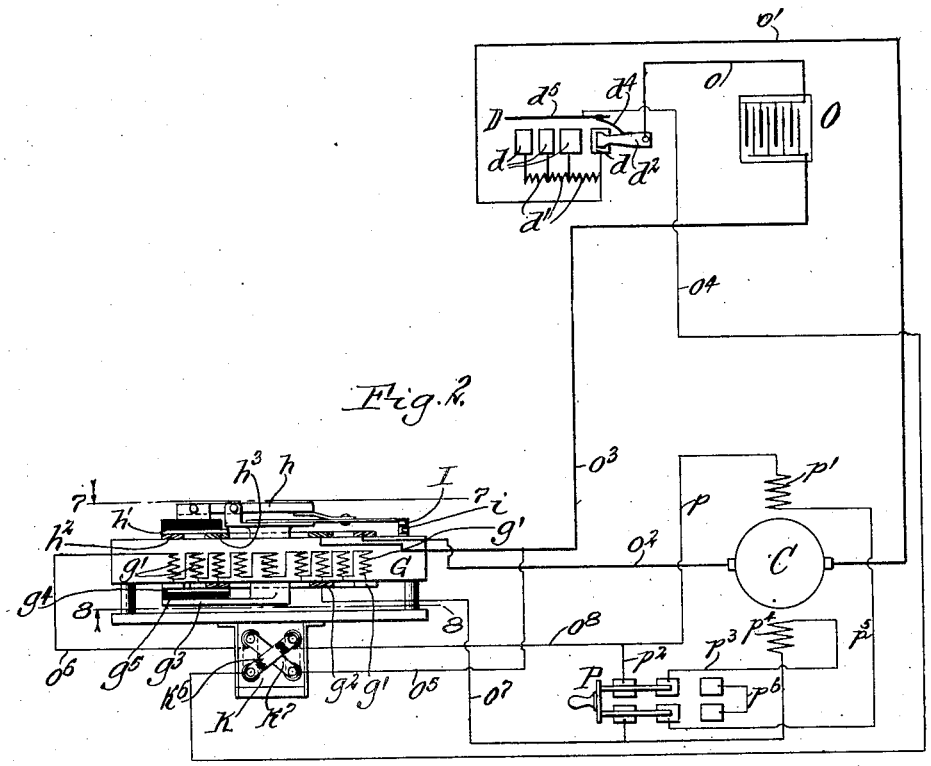
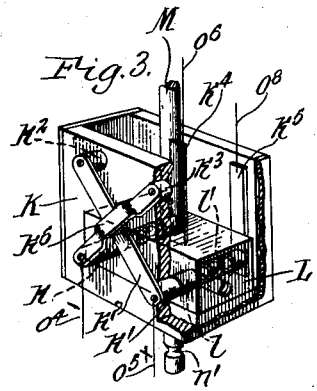
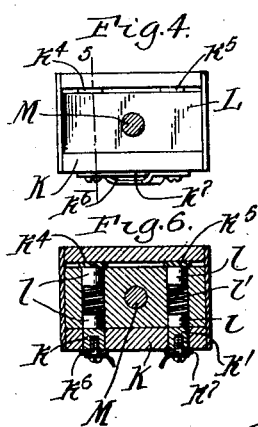
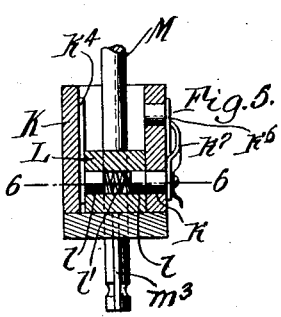
Inventor
Frederick G. Peck
by Wilhelm Parker
Attorneys
Witnesses:
Richard Sommer
A. G. Dixon F. G. PECK.
CONTROLLING MEANS FOR ELECTRIC VEHICLES.
APPLICATION FILED JUNE 23, 1914.
1,245,264.
Patented Nov. 6, 1917.
3 SHEETS—SHEET 3.
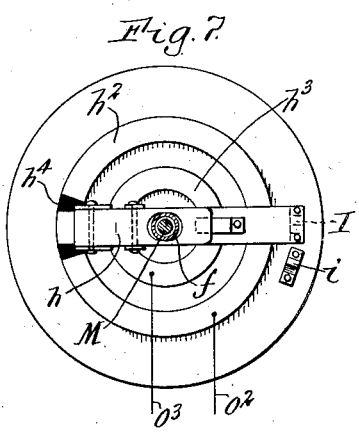
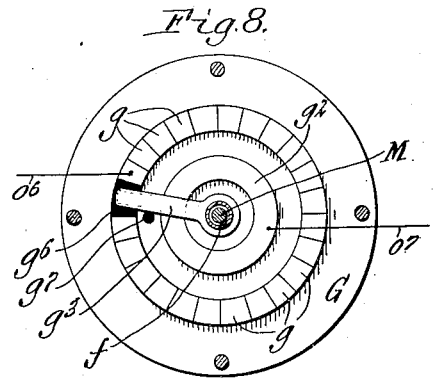
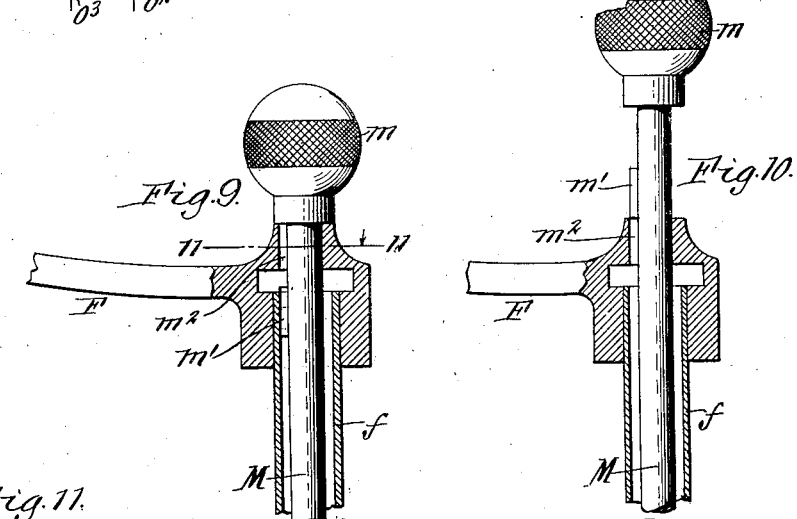
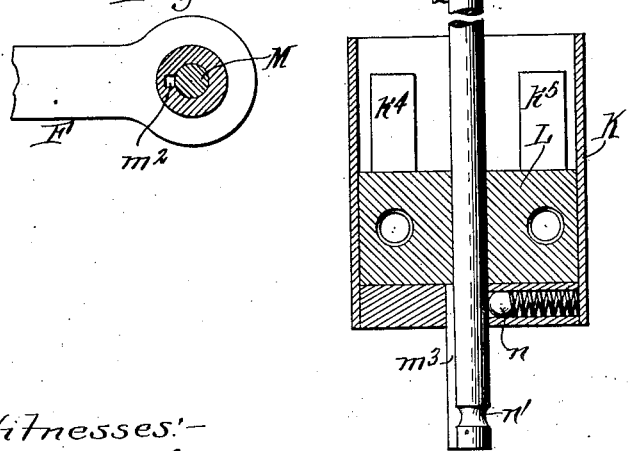
Witnesses:—
Richard Sommer
A. G. Dumond
Inventor
Frederick G. Peck
by Wilhelm T. Parker
Attorneys.

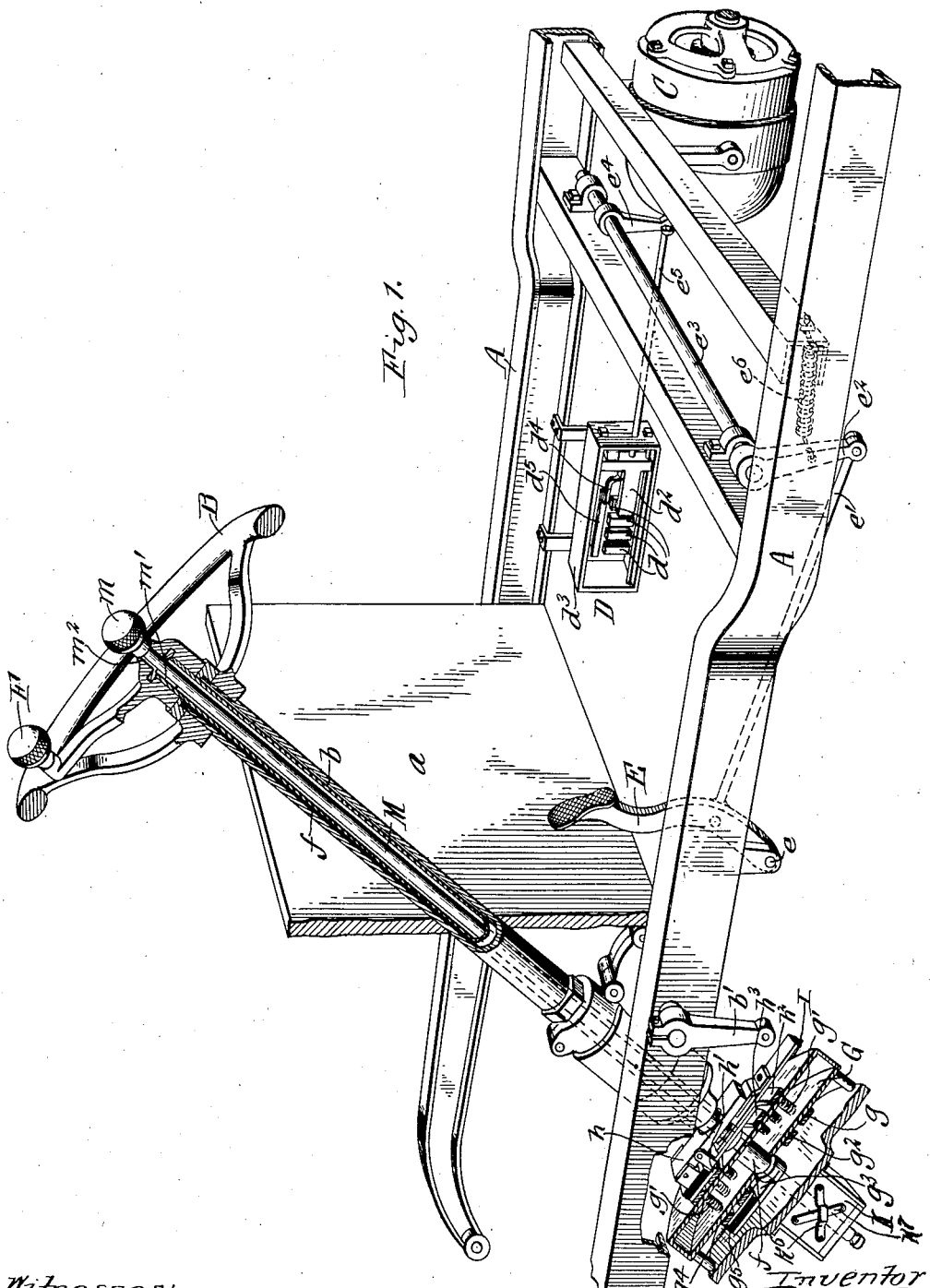

UNITED STATES PATENT OFFICE.

FREDERICK G. PECK, OF BUFFALO, NEW YORK, ASSIGNOR TO BUFFALO ELECTRIC VEHICLE COMPANY, OF BUFFALO, NEW YORK.

CONTROLLING MEANS FOR ELECTRIC VEHICLES.

1,245,264.  Specification of Letters Patent.  Patented Nov. 6, 1917.

Application filed June 23, 1914. Serial No. 846,782.

*To all whom it may concern:*

Be it known that I, FREDERICK G. PECK, a subject of the King of Great Britain, residing at Buffalo, in the county of Erie and State of New York, have invented a new and useful Improvement in Controlling Means for Electric Vehicles, of which the following is a specification.

This invention relates to electrically propelled vehicles and to means for controlling the operation of the same.

Heretofore series motors have been almost universally used for operating electrically driven vehicles, the use of a shunt motor for this purpose having been considered undesirable for the reason that these motors, as ordinarily constructed, do not give the desired torque in starting and when operating at slow speeds. Motors of this kind are, however, very desirable for this purpose when the fields are so constructed that they can be magnetized to a high degree so that a high torque can be obtained at slow speeds. Shunt motors so constructed have been found to be eminently successful when used on electrically propelled vehicles and possess great advantages over series motors, among which the following may be stated:

The motors can, under ordinary running conditions, be controlled by controlling the field current, which results in a higher efficiency owing to the fact that the rheostatic losses are reduced; also the motor automatically acts as a generator and restores electric power to the source of power supply when the vehicle is running down grade or is being retarded by an increase in the field strength of the motor, the motor under these conditions acting as a brake and preventing the wearing out of the friction brakes and the dissipation of power therein; also the vehicle, when the controlling means are adjustable for one speed, will operate substantially at that speed whether the vehicle is running up or down grade, so that very little adjustment of the controlling apparatus is required.

The objects of this invention are to adapt a shunt motor for operating electrically propelled vehicles, and to provide means for conveniently controlling the operation of motors of this kind, and to this end, the driving and controlling mechanism comprises a shunt motor having its armature current controlled by means of a resistance device actuated by a pedal which is normally held in position in which none of the resistance is in the armature circuit. The mechanism also comprises a rheostat or resistance device for controlling the strength of the field current which is operable by means of a hand lever, preferably mounted on the steering column of the vehicle. By means of this arrangement of the controlling mechanism, the foot controlled armature resistance is only actuated in stopping and starting the vehicle and the speed of the motor is entirely controlled by the hand operated device. The mechanism also includes a reversing switch actuated from the steering column.

In the accompanying drawings:

Figure 1 is a perspective view of a chassis having a motor and the regulating mechanism therefor embodying the invention mounted thereon.

Fig. 2 is a diagrammatic view of the electrical connections between the various parts of the driving and controlling mechanism of the vehicle.

Fig. 3 is a perspective view, on an enlarged scale, of the reversing switch.

Fig. 4 is a sectional view thereof taken on a line at right angles to the axis of the steering column.

Fig. 5 is a sectional view thereof on line 5—5, Fig. 4.

Fig. 6 is a sectional view thereof on line 6—6, Fig. 5.

Figs. 7 and 8 are sectional views of a field controlling device on lines 7—7 and 8—8, respectively, Fig. 2.

Figs. 9 and 10 are elevations, on an enlarged scale, of the reversing switch and the means for actuating the same.

Fig. 11 is a sectional view thereof on line 11—11, Fig. 9.

A represents the chassis of an electrically driven vehicle on which the parts of the driving and controlling mechanism are mounted, *a* the dash of the vehicle, and B the steering wheel, which is rigidly connected to a tube or steering column *b* pivoted in the chassis. The tube *b* is connected by suitable gearing to an arm *b'* connected to the steering mechanism (not shown) of the vehicle. C represents an electric motor by means of which the vehicle is driven and which is mounted on the chassis. These parts may be of any suitable construction, the motor being however shunt wound so that the field current can be controlled independently of the armature current. In order to produce a shunt motor having a large torque at low speeds, the fields are designed to be capable of a high degree of magnetization and this is preferably done by increasing the turns in the field coils or the field current, or both, somewhat above the normal.

The armature current of the motor is controlled by means of a resistance device D actuated through intermediate mechanism by a pedal E mounted on the vehicle where it is readily accessible to the driver's foot. In the construction shown, the resistance device D comprises a plurality of fixed contacts $d$ connected by resistance units $d'$ of any suitable kind (Fig. 2), and a movable contact $d^2$ adapted to be moved into engagement with any of the fixed contacts. These parts, see Fig. 1, are all arranged in a box or suitable container $d^3$ mounted on the vehicle. The movable contact $d^2$ is slidably arranged in the box $d^3$ and is provided with a part $d^4$ adapted to engage a fixed contact bar $d^5$ for completing the field circuit of the motor, as will be explained hereinafter. The contact bar $d^5$ projects slightly beyond the first of the fixed contacts $d$, so that the field circuit is completed before the armature circuit is closed.

The pedal E is pivoted at $e$ on the chassis and is connected with the movable contact $d^2$ of the resistance device by means of a link $e'$ pivoted at one end to the pedal and at its other end to an arm $e^2$ rigidly secured to a rod $e^3$ extending transversely of the vehicle and journaled on the chassis. A second arm $e^4$, also rigidly secured on the rod $e^3$, is connected to one end of a rod $e^5$, the other end of which is connected to the movable contact $d^2$. Any suitable means may be provided for normally drawing the pedal E rearwardly, for example, a spring $e^6$, connected at one end to the arm $e^2$ and at its other end to the chassis. The parts of the mechanism described are so arranged that when the pedal is in its normal position, as shown in Figs. 1 and 2, the movable contact will be in engagement with the last of the fixed contacts $d$, so that none of the resistance units are in the armature circuit and the rheostatic losses are thereby avoided. The motor can then be stopped by pushing the pedal forwardly against the action of the spring $e^6$. Any other suitable connection between the pedal E and the resistance device D may be used.

The strength of the field current is controlled by a hand operated resistance device which is so arranged on the vehicle as to be readily accessible, since under ordinary running conditions the speed of the vehicle is controlled entirely by regulating the field current. In the construction shown for this purpose, a controller handle F is arranged at the upper portion of the steering column adjacent to the steering wheel and is rigidly secured to a tube $f$, arranged within the tube $b$ and concentric therewith. The lower end of the tube $f$ is connected with the movable member of a suitable rheostat or resistance device for controlling the field current. In the construction shown, this resistance device comprises a stationary plate G of insulating material secured adjacent to the lower end of the steering column and having a plurality of contact segments $g$ mounted thereon, the segments being connected by resistance units $g'$, and a contact ring $g^2$ (see Figs. 1, 2 and 8). The movable member of the resistance device comprises an arm $g^3$ connected to the tube $f$ and a contact plate $g^4$ on the arm which is adapted to connect the segments $g$ with the contact ring $g^2$, an insulating plate $g^5$ being placed between the contact plate $g^4$ and the arm $g^3$. In order to enable the field circuit to be opened for stopping the motor, a segment $g^6$ of insulating material is mounted on the plate G in position to be engaged by the contact plate $g^4$ when the arm $g^3$ of the controller is in position to open the field circuit. A stop pin $g^7$ prevents the arm from moving beyond the insulating segment $g^6$.

It is desirable to provide means for opening the armature circuit at the same time the field circuit is opened, so as to prevent injury to the armature by an excessive current flowing through the same, as would be the case if the field circuit were opened, and so that the motor can be stopped by the hand lever as well as by the pedal. For this purpose the tube $f$ is provided with a second arm $h$ (see Figs. 1, 2 and 7) having a contact plate $h'$ adapted to connect two contact rings $h^2$ and $h^3$ insulated from each other and mounted on a plate H, which is suitably connected with the plate G. An insulating segment $h^4$ is inserted in the ring $h^2$ and is so located that the plate $h'$ of the arm $h$ will engage therewith when the plate $g^4$ engages the insulating segment $g^6$, so that the circuit will be broken when the plate $h'$ is in engagement with the segment $h^4$. Any other means for breaking the armature circuit when the field circuit is opened may be employed.

In order to prevent the operator from inadvertently opening the field and armature circuits of the motor, a spring detent I is preferably secured to one of the arms projecting from the tube $f$, for example, the arm $h$. The detent engages with a projecting part $i$ fixed on the plate H and is yieldingly held thereby against moving into its "off" position. Upon exerting a little more force, the detent I can be forced to ride over the projection $i$ to shut off the flow of current to the motor.

The motor can be reversed by reversing the direction of the field current. Any suitable means may be employed for this purpose. In the construction shown, a switch for reversing the field current is arranged to be operated from the steering column. This switch is preferably arranged below the resistance device which controls the field current, and consists of a rectangular closed casing K having stationary contacts arranged thereon, and a movable contact member L slidably arranged therein. At one side of the casing four contacts, $k$ $k'$ $k^2$ $k^3$, are provided which extend through the side wall of the casing, and two conducting strips $k^4$ $k^5$ are arranged at the opposite side wall of the casing. The contacts $k$ $k'$ $k^2$ and $k^3$ are arranged in pairs, one pair being located above the other. The diagonally opposite contacts of the two pairs are connected by conductors $k^6$ $k^7$, so that each of the two contacts in vertical alinement are of opposite polarity. The movable member L of the switch has two connecting members extending through the same and arranged in holes extending through the movable member, each connecting member comprising two plugs $l$ of conducting material slidable in a hole in the movable member, and a spring $l'$ interposed between the plugs and tending to move the same into engagement with the side walls. When the movable member is in its lower position, as shown in Figs. 3 and 5, the plugs $l$ of the connecting members engage with two of the contacts $k$ $k'$ and connect the same respectively with the strips $k^4$ $k^5$. When the movable member is in its upper position, the connecting members will connect the strips $k^4$ and $k^5$ respectively with the contacts $k^2$ and $k^3$, so that the current flowing through the strips is reversed.

The movable member L of the reversing switch is moved from one position to another by means of a rod M connected therewith and extending through the steering column. The upper end of the rod M terminates in a knob $m$ at the upper end of the steering column, by means of which the rod may be pulled out to reverse the field current of the motor. In order to permit the rod M to be pulled out for reversing the motor only when the controller handle F is in a position to shut off the supply of current to the motor, the rod M is provided with a key $m'$ and the controller handle F has a slot $m^2$ through which the key is adapted to pass when the slot is in alinement with the key, as shown in Figs. 9 and 10. The rod M is prevented from turning by means of a key $m^3$ engaging a slot in the base of the casing K of the reversing switch. The rod M is yieldingly held in its upper or reverse position by means of a spring detent or ball $n$ engaging a slot $n'$ in the rod. Any other means for actuating a switch for reversing the motor may be employed if desired.

The several parts of the driving and controlling mechanism may be electrically connected as shown diagrammatically in Fig. 2, in which figure O represents a storage battery which supplies power to the vehicle and one terminal of which is connected by means of a conductor $o$ to the movable member $d^2$ of the resistance device D through which the armature current of the motor is controlled. The fixed contacts of the resistance device are connected by means of a conductor $o'$ to one of the terminals of the armature of the motor C. The other armature terminal is connected by means of a conductor $o^2$ to the ring $h^2$ of the hand operated controller, and the other ring $h^3$ is connected to the other battery terminal by a conductor $o^3$.

The current for energizing the field coils of the motor flows through conductor $o$, which is connected to the battery O, through the movable member $d^2$ of the resistance varying device D, and then through the contact bar $d^5$ when contact is made between this bar and the member $d^2$, and through conductor $o^4$ to the contact $k$ of the reversing switch which may be connected with either the conducting strip $k^4$ or $k^5$. The other contact $k'$ of the reversing switch is connected with the other side of the battery O by means of conductors $o^5$ and $o^3$. The conducting strip $k^4$ is connected by means of a conductor $o^6$ with the first of the segments $g$ and the contact ring $g^2$ is connected by means of a conductor $o^7$ with the fields of the motor. The conducting strip $k^5$ is connected to the motor fields by means of a conductor $o^8$.

The fields of the motor are, under ordinary running conditions, connected in series. Suitable means are, however, provided for connecting the field coils in groups arranged in parallel so as to afford an extra great torque for starting, or for heavy loads or hill climbing. A switch P is shown diagrammatically in Fig. 2 for this purpose. When this switch is in the position shown, the current in the conductor $o^8$ flows through two branches, one branch $p$ leading to one of the groups of field coils represented diagrammatically at $p'$, and the other branch including conductor $p^2$, one of the switch blades, and conductor $p^3$ and leading to the other group of coils represented diagrammatically at $p^4$. Conductor $p^5$ connects the other end of the group of field coils $p'$ to the other switch blade, through which current flows to the conductor $o^7$, which leads to the group of field coils $p^4$. When the switch P is in its other position, the conductors $p^3$ and $p^5$ are directly connected by means of conductor $p^6$, so that the field coils are connected in series, the path of the current being from conductor $o^8$ through conductor $p$, field coils $p'$, conductor $p^5$, through the blades of the switch and conductor $p^6$ to conductor $p^3$, thence through coils $p^4$ and to conductor $o^7$. By means of this connection the motor can be caused to exert a powerful torque either for running or stopping the vehicle.

The vehicle described can be operated economically, since the rheostatic losses in controlling the speed by regulating the field current are much less than the losses incident to regulating the armature current. The motor also automatically becomes a generator and restores power to the batteries or source of current supply when the vehicle runs down grade or is brought to a stop by increasing the field current. In starting the vehicle, the pedal is first pressed forward and the controller handle is then moved to the first segment. The pedal is then permitted slowly to return to its normal position, thus permitting current to flow through the armature and starting the motor. The speed of the motor after starting can be controlled entirely by the field resistance device, each of the segments $g$ corresponding to a definite speed of the motor, which speed will be substantially maintained whether the vehicle is running on the level, up hill or down hill. If an especially heavy torque is required, for example, for starting on a grade, the switch P is placed in the position shown in Fig. 2, to connect the field coils in multiple instead of in series. The reversing device is very simple to operate and is so constructed that it cannot be operated except when the controller handle is in position to shut off the current from the motor.

The mechanism described enables the vehicle to be very easily operated and is so constructed that the driver can devote practically all his attention to the steering of the vehicle, since a substantially constant speed is maintained automatically.

I claim as my invention:

1. In an electrically propelled vehicle, the combination with a shunt motor operatively connected for driving the vehicle, and a steering column, means for regulating the armature current of said motor, a resistance device for controlling the field current of said motor, said resistance device being arranged near the base of said steering column, an operating handle at the upper end of said steering column, connections extending through said column between said resistance device and said handle, a reversing switch at the lower end of said column, and a rod extending through said column for actuating said switch from the upper end of said column.

2. In an electrically propelled vehicle, the combination with a shunt motor operatively connected for driving the vehicle, hand controlled means for regulating the field strength of the motor, foot controlled means for regulating the armature current of said motor, and means operated by said hand controlled means for opening the armature circuit when the field circuit is broken.

3. In an electrically propelled vehicle, the combination with a shunt motor operatively connected for driving the vehicle, a hand operated resistance device for regulating the field strength of the motor and adapted to open the armature circuit of said motor when the field current is broken, means for connecting the field coils of the motor in series and for connecting groups of coils in parallel, a resistance device for regulating the armature current of the motor, and a pedal for actuating the resistance for said armature current, said pedal being normally held in position to cut out said resistance in the armature circuit.

4. In an electrically propelled vehicle, the combination with a shunt motor operatively connected for driving the vehicle, means for regulating the field strength of the motor, a resistance device for regulating the armature current of the motor, including a pedal which is normally held in position to cut out said resistance device, and means operated by said field strength regulating means for opening the armature circuit when the field circuit is broken.

5. In an electrically propelled vehicle, the combination with a shunt motor operatively connected for driving the vehicle, and a steering column having a plurality of rigid members arranged therein and extending throughout the length thereof, a resistance device for controlling the field current of said motor and operatively connected with one end of one of said rigid members, an operating handle connected with the other end of said member, a reversing switch connected with one end of another of said rigid members, said other member being adapted to be actuated from the upper end of said steering column, and means for varying the armature current of said motor.

Witness my hand, this 19th day of June, 1914.

FREDERICK G. PECK.

Witnesses:
WILLIAM R. McCONNELL,
CORDEN HACKETT.